E. H. LANIER.
PASTRY MAKING APPARATUS.
APPLICATION FILED DEC. 10, 1908.
1,257,497.
Patented Feb. 26, 1918.
4 SHEETS—SHEET 1.
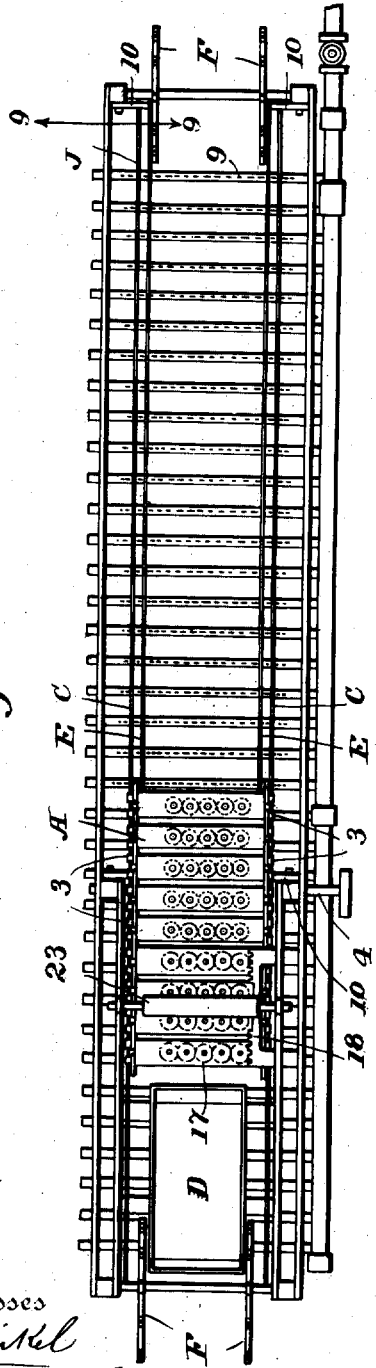
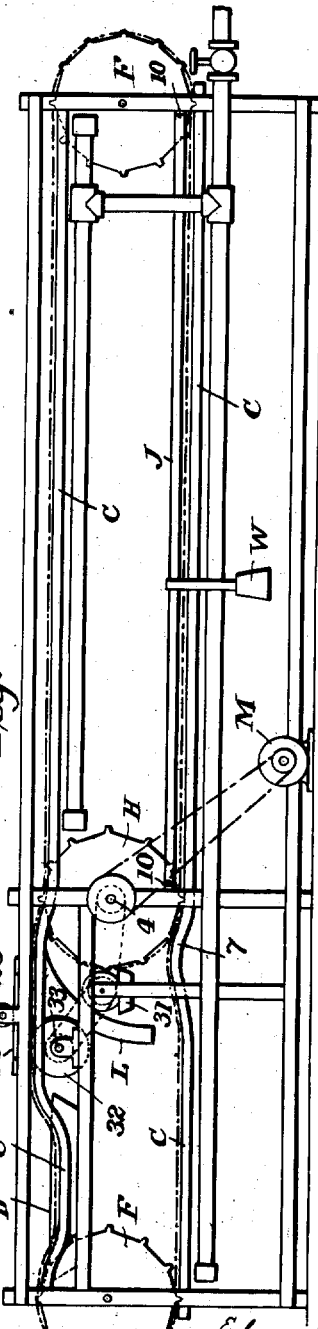
Witnesses
Inventor
Edward H. Lanier
Attorneys

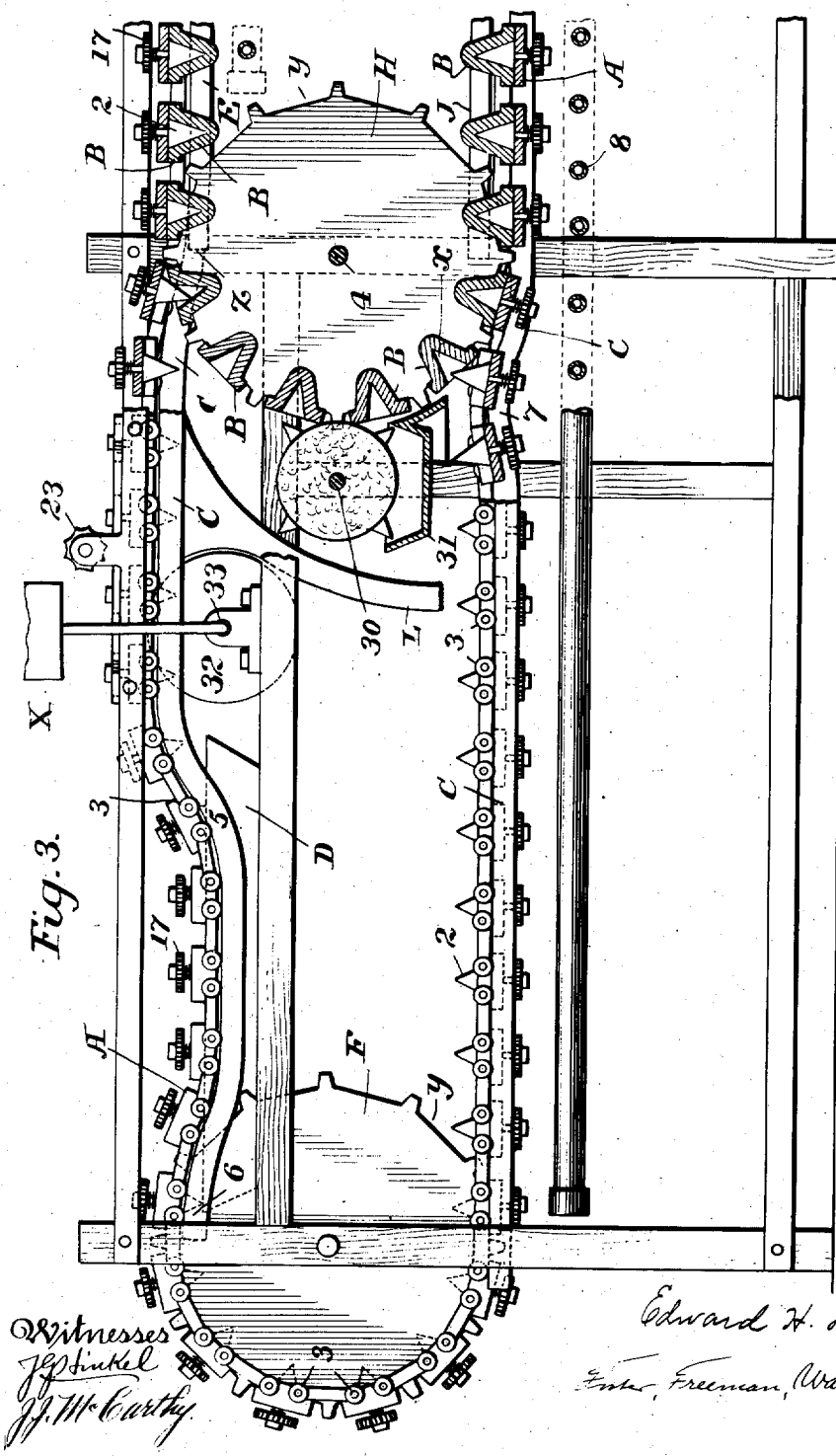

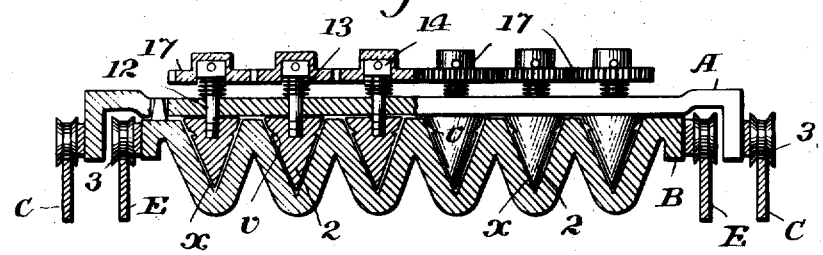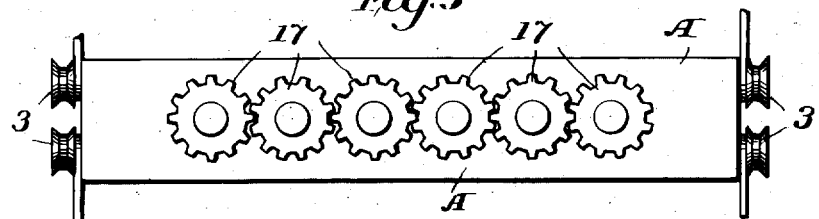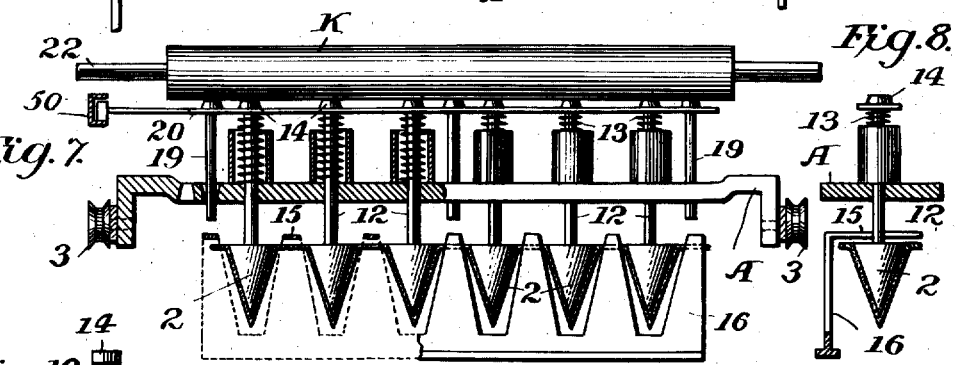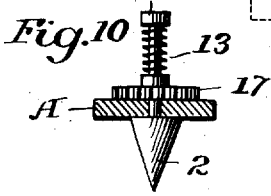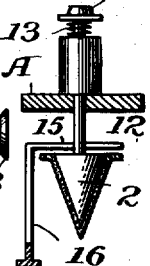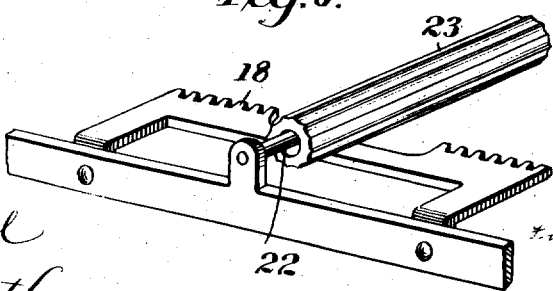

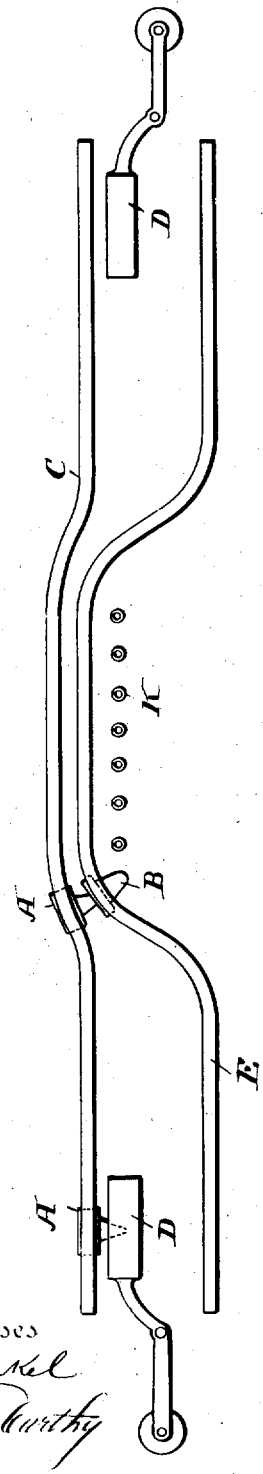
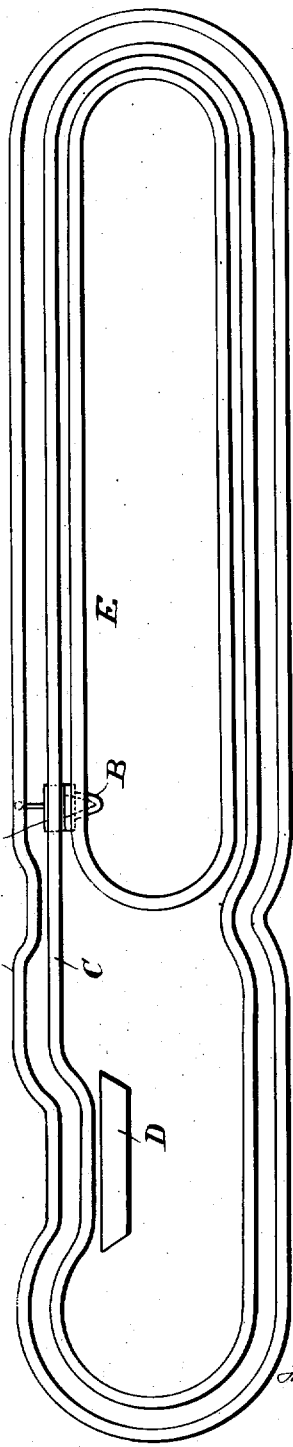

UNITED STATES PATENT OFFICE.

EDWARD H. LANIER, OF CINCINNATI, OHIO.

PASTRY-MAKING APPARATUS.

1,257,497.  Specification of Letters Patent.  Patented Feb. 26, 1918.

Application filed December 10, 1908. Serial No. 466,868.

*To all whom it may concern:*

Be it known that I, EDWARD H. LANIER, a citizen of the United States, and resident of Cincinnati, in the county of Hamilton and State of Ohio, have invented certain new and useful Improvements in Pastry-Making Apparatus, of which the following is a specification.

My invention relates to the manufacture of that class of pastry which is in the form of cones intended for ices and other purposes, and to this end it consists of an apparatus in which I make use of two series of molds or dies, one with cones and the other with corresponding sockets, and means whereby the cones are coated and the two parts then brought together and heated and then separated and the baked material detached, and in certain details of construction and means of operation, all as fully set forth hereinafter and as illustrated in the accompanying drawings, in which:

Figure 1 is a side view of an apparatus embodying my invention;

Fig. 2 a plan view;

Fig. 3 an enlarged longitudinal section at one end of the apparatus;

Fig. 4 a transverse section illustrating the construction of the male and female dies or carriers;

Fig. 5 a plan of Fig. 4;

Fig. 6 a perspective view of part of the apparatus;

Fig. 7 a transverse section illustrating a somewhat different arrangement of parts from that shown in Fig. 4, together with certain detaching means;

Fig. 8 a transverse section on the line 8—8, Fig. 7;

Fig. 9 an enlarged sectional view on the line 9—9, Fig. 2;

Fig. 10 a sectional view illustrating a detail;

Figs. 11 and 12 diagrams illustrating modifications.

In the manufacture of hollow cones of pastry or like material I make use of a plurality of pairs of dies, or carriers, as I prefer to call them, one of which, A, Fig. 4, supports a plurality of cones 2, 2 of the shape in which it is desired to mold and bake the pastry, and the other, B, is provided with a series of sockets $x$, each adapted to receive one of the cones of the carrier A, so that the two members constitute in fact male and female dies. Series of pairs of like carriers are operated upon together in such manner that the cones after being dipped into a batter will be brought into the sockets of the other carriers, and, while the two sets of carriers are thus together, will be heated to bake the material, after which the carriers of the two sets are successively separated and the baked material removed from the cones.

In carrying out these operations the carriers may be operated upon in different ways. For instance, as indicated by the diagram 11, the male carriers or cone carriers may be guided back and forth upon a pair of tracks C, and the female or socketed carriers may be guided back and forth upon a pair of tracks E. A receptacle D may be so arranged at each end that it may be moved to and from the cone carriers so as to coat the cones thereof, and the tracks of the two sets of carriers are so constructed as to bring them together after such coating is effected and maintain them in contact above a suitable heater K, consisting of a coil of steam pipes or perforated gas pipes, or of any other suitable character, and after the carriers have been sufficiently heated they are separated by the deflection of the tracks. In the construction shown in Fig. 11, the carriers after being separated are passed to the opposite end of the machine; the material is removed from the cones by hand, if necessary, and the latter are again coated and moved in a reverse direction. In the case supposed the carriers are pushed forward in contact with each other but are not necessarily connected, although preferably they are formed into a chain, being linked together.

In the construction shown in Fig. 12 the two tracks C, E are each continuous and so formed that the cone carriers will travel upon the outer track parallel to the inner track for a part of the length of the outer track, but the outer track extends beyond the inner track so that the cone and socketed carriers will be separated as the cone carriers are carried beyond the limits of the inner track, and will be again brought together below the inner track after the cone carriers are coated. To effect such coating the outer track may be dipped or deflected downward to a slight extent above the paste or batter receptacle D so that the cones are introduced into the said receptacle for a time and then lifted out. In the illustration in Figs. 11 and 12 the tracks are supposed to be continuous grooves in suitable side rails, and the carriers of each series may be loosely in contact, or, preferably, chained together.

A preferable construction for many purposes is illustrated in the remaining figures of the drawings in which the substantially horizontal portions of the tracks consist of rails C, while the curved connecting portions are formed in the shape of rotatable guides consisting of disks F with recesses $y$ to receive the ends of the carriers, the series of cone carriers being linked together. In this construction the rails C, C for the cone carriers are arranged outside of the rails or guides E, E for the socketed carriers, as best shown in Fig. 4, and the rails E terminate at a point $z$, Fig. 3, where the cone carriers are received in the notches of the disks H hereinafter more particularly referred to. To reduce friction the different carriers are provided with anti-friction rollers 3, which run upon the rails.

As shown in Figs. 1 and 2 the series of cone carriers are guided upon the substantially parallel rails C, C and by the rotatable guide disks F, F, and at the desired point between the two pairs of guide disks F, F are arranged the guide disks H upon a drive shaft 4, and as a result of this construction the cone carriers will be carried around the disks at the left of Fig. 1 and upon the bottom rails C, C to the disks H where they will be met by the socketed carriers, the cones being introduced into the sockets of said carriers and the two series of carriers being then carried together along the bottom rails C, and together around the disks F at the right, and together upon the upper guide rails C, E, until they are above the shaft 4 of the disks H. At this point the rails E terminate so that the socketed carriers may pass from these rails E onto the peripheries of the disks H, being received in the recesses $y$, thereof, and being thus guided to travel in a circle downward to meet the cone carriers that are traveling upon the lower rails, as before described. If desired where the carriers are not connected by links a suitable guard I may be arranged to hold the carriers B in the recesses $y$ until said carriers are directly above the cone carriers.

In order to properly free the cones from the sockets as the socketed carriers B on the guide disks are separated from the upper cone carriers it is best to elevate the tracks C slightly at a point beyond the disks H, as best shown in Fig. 3, and in order that the cones may be properly coated with the batter I prefer to deflect or bend downward the guide tracks C between the points 5, 6, Fig. 3, adjacent to the batter receptacle D, Fig. 3, so that the cones will be caused to dip into and pass through the batter and then rise out of the same as the carriers pass onto the guide disks F. Further to insure the proper introduction of the cones into the sockets of the carriers B as the latter are brought by the disks H to contacting position, I prefer to form an upward bend in the outer tracks C at the point 7, Fig. 3.

Beyond the point where the two series of carriers are brought together I arrange suitable heating means, as for instance a series of perforated gas pipes 8, the flame of which is directed upon both sets of carriers so as to heat the same as they travel toward the right in Figs. 1 and 2, and a second series of perforated gas pipes 9 may be arranged above the first so as to heat the carriers as they pass from the guide disks F at the right toward the guide disks H, and also from the left toward the disks H.

To insure the proper molding of the material it is best to bring the two sets of carriers together under more or less pressure. This may be done in different ways, but in the construction shown I support a bearing rail J by pivoted arms 10 at each side of the machine above the lower track C between the disks F, H, in such position as to bear upon the rollers 3 of the socketed carriers then in inverted position Fig. 9 and press the latter down against the cone carriers with a degree of pressure which may be regulated by means of a weight W hanging from the rail J.

Any suitable means may be employed for detaching the baked articles after the baking is completed. Preferably in order to insure that they may remain in contact with the cones the latter have slight notches $v$, Fig. 4, in their peripheries which is sufficient to insure the desired adhesion.

As the material will thus adhere to the cones when the latter are withdrawn from the sockets of the carriers B, it becomes necessary to detach the same before the cones are again introduced into the batter, and to this end I connect each cone to a sliding rod 12, sliding in the carrier A and normally carried in one direction by a spring 13 bearing upon a button or head 14 on the rod, and on the carrier so as to normally maintain the base of the cone in contact with the carrier. After the cones leave the sockets the carriers A are brought beneath a cross bar or other suitable actuating device K, whereby the rods are depressed and as thus depressed the upper portions of the cones will be brought to a plane so as to pass beneath certain horizontal fingers 15 upon standards 16, and as the rods pass from beneath the device K they are elevated by the springs 13, and the material adhering to the cones and which extends beyond the latter (in consequence of the spreading of the batter when placed upon the cones) will be caught by the fingers 15 and held so that the cones can separate therefrom, the baked material then falling into a suitable chute L, by which it may be directed into any desired receptacle. To more effectually insure the separation of the material from the cones, in consequence of the adhesion afforded by the recesses $v$, I may rotate the cones by rotating the rods or stems 13. One means of doing this is illustrated in Figs. 4, 5 and 6 where the rods are shown as provided with meshing pinions 17, and the end pinion is brought at the proper time against the stationary rack 18 secured to the frame, and as the carriers travel forward the pinions are rotated and the cones also are rotated, this operation being effected of course after the cones have left the sockets of the carriers B and insuring separation of the material from the cones inasmuch, as before described, as the batter extends between the different cones and prevents the material from turning when the cones are rotated. In some instances it is not necessary to thus rotate the cones, in which case the construction may be as illustrated in Figs. 7 and 8, and in order to more effectually force away the material on the cones and on the carrier A, I may perforate the latter for the passage of pushers, shown in the form of pins 19, 19 secured to a crossbar 20, connected with all of the pins or stems 13, and on the depression of the crossbar 20 the pins 19 are forced through the carrier A, against the material that has been baked, in contact with the said carrier so as to force shells of baked material away from the carrier and from the cones and also into position to be carried beneath the fingers 15 in case the latter are also used in this connection.

In Fig. 10 I have shown the arrangement where both the fingers 15 and the rotating cones are employed. I have found it better to make the actuating device K in the form of a rod 22, upon which loosely rotates a corrugated sleeve 23, the opening in which is greater in diameter than the rod and which will properly engage the knobs 14 at the ends of the stems 13, and rods 19, and insure the depression of the latter without acting too positively.

It will be evident that the carriers may be differently constructed and guided and that each carrier may have any desired number of cones or sockets, and that they may be propelled one after the other whether in contact or linked together, or independently by different means.

In order to properly grease the molds I, make use of lubricating apparatus arranged between the disks H and the receptacle or pan D. As shown a shaft 30, adjacent to the disks H, carries a series of disks of cloth or felt or other suitable material which rotate in grease in a pan 31, and the shaft 30 is driven from the shaft 4 so as to rotate the roll and lubricate the female molds, the shaft 4 being driven from a motor M or in any other suitable manner. There is also a cylindrical grease roller 32 upon a shaft 33 driven from the shaft 30 and in contact with which the cones are successively brought so as to be properly lubricated.

The shaft 33 is perforated and communicates at the end with a grease tank X, from which a supply passes to the roller 32 in sufficient quantity to properly lubricate the cones. The roller 32 is preferably made of cloth. Preferably the roller on the shaft 30 has nipples adapted to enter the molds.

If desired the vertical movements may be imparted to the cross bar 20 by means of side tracks 50, Fig. 12, into which rollers at the ends of the cross bar extend, said track bent as required to carry the bar 20 to and from the carrier.

Without limiting myself to the construction and arrangement shown, I claim:

1. In a pastry molding apparatus the combination of a plurality of carriers each provided with a plurality of cones, means for applying batter in a liquid condition to said cones, a plurality of carriers having sockets therein, and means for directing the carriers in courses to bring the cones into and then out of the sockets.

2. In a pastry molding apparatus the combination of a plurality of carriers each provided with a plurality of cones, means for applying batter in a liquid condition to said cones, a plurality of carriers having sockets therein, and means for directing the carriers in continuous courses to bring the cones into and then out of the sockets.

3. A pastry molding and baking machine in which are combined two series of carriers, one provided with cones and the other with corresponding sockets constructed to mold a series of independent articles, means for applying batter in a liquid condition to the cones, means for conducting the carriers to each other and moving them together, means for baking the batter between the cones and sockets, and means for thereafter separating the cones and sockets.

4. The combination in a pastry molding machine, of a connected series of carriers provided with cones, another connected series of carriers provided with sockets, means for applying batter in a liquid condition to the cones, and guides partly parallel and partly diverging, arranged to direct the carriers toward each other and to bring the cones into the sockets, maintain this relation for a defined distance, and then separate them.

5. The combination in a pastry molding machine, of a connected series of carriers provided with cones, another connected series of carriers provided with sockets, means for applying batter in a liquid condition to the cones, guides partly parallel and partly diverging, arranged to direct the carriers toward each other and to bring the cones into the sockets, maintain this relation for a defined distance and then separate them, and means for positively driving the carriers.

6. The combination in a pastry molding machine of two series of traveling carriers provided respectively with cones and sockets, a batter pan, means for causing the cones to be coated with batter from the pan, means for guiding the socketed carriers to introduce the coated cones into the sockets and conduct the two carriers together, and means for then separating the carriers.

7. The combination in a pastry molding and baking machine of two series of traveling carriers provided respectively with cones and sockets, a batter pan, means for guiding the cones over the pan and causing them to receive coatings of batter therefrom, means for guiding the socketed carriers to introduce the coated cones into the sockets and conduct the two carriers together, means for heating the carriers while together to bake the batter between the sockets and cones, and means for then separating the carriers.

8. The combination in a pastry molding and baking machine of two series of traveling carriers provided respectively with cones and sockets, a batter pan, means for causing the cones to be coated with batter from the pan, means for guiding the socketed carriers to introduce the coated cones into the sockets and conduct the two carriers together, means for baking the batter between the sockets and cones, means for then separating the carriers, and positively acting means for separating the baked material from the carriers.

9. In an apparatus for the purpose described, the combination of a receptacle for liquid batter, a plurality of cone carriers connected to move successively past said receptacle, a plurality of socketed carriers, means for moving both sets of carriers and causing the cones to receive coatings of liquid batter from said receptacle and positioning each coated cone in a socket, and means for baking the batter on the cones within the sockets, the cones and sockets being automatically separated after the baking operation and the baked articles discharged therefrom.

10. In an apparatus for the purpose described, the combination of a receptacle for liquid batter, a plurality of cones adapted to be simultaneously coated by batter from said receptacle, a plurality of sockets each adapted to receive one of the coated cones, means for baking the batter on the cones within the sockets, means for moving the cones into and from the batter receptacle and engaging and disengaging the coated cones and sockets, and means for positively detaching the baked articles from the cones.

11. In an apparatus for the purpose described, the combination of a receptacle for liquid batter, a plurality of cones adapted to be simultaneously inserted into said receptacle to be coated by the batter, a plurality of sockets each adapted to receive one of the coated cones, means for baking the batter on the cones within the sockets, means for moving the cones into and from the batter receptacle and engaging and disengaging the coated cones and sockets, and means adapted to detach the baked articles from the cones by contact with said articles.

12. In an apparatus for the purpose described, the combination of a receptacle for liquid batter, a plurality of socketed carriers connected to move together, and a plurality of cones connected to move together and adapted to successively enter, move with and be separated from said carriers, the batter receptacle being positioned so that each cone will be moved into and from the same during its travel while disengaged from said carrier.

13. The combination with two series of traveling carriers having cones and sockets as described, of means for greasing the cones and sockets, means for depositing batter on the cones, means for then directing the cones into the sockets, means for heating the carriers, and means for thereafter separating them.

14. The combination with the traveling cone carriers and socketed carriers of a pastry molding machine, of means for applying batter in a liquid condition to the cones, means for bringing the carriers together and separating them, and means for applying pressure to force the cones into the sockets.

15. The combination with the traveling cone carriers and socketed carriers of a pastry molding machine, of means for applying batter in a liquid condition to the cones, means for bringing the carriers together and separating them, and means for applying a yielding pressure to force the cones into the sockets.

16. The combination with means for conveying a series of socketed carriers in a horizontal limited path and for then deflecting the same from said path, of guides for a series of carriers provided with cones constructed to guide said cone carriers parallel to the socketed carriers for a part of the course and to lift the cone carriers as the socketed carriers are deflected.

17 The combination in a pastry molding and baking apparatus with a series of cone carriers, of a plurality of cones for each carrier, sliding rods to which said cones are connected, and means for moving said rods vertically for the purpose set forth.

18. The combination in a pastry molding and baking apparatus with a cone carrier, of cones, a rod connected with each cone, springs for lifting the cones to bring their bases against the carrier, and means for sliding the rods to carry the cones from the carrier.

19. The combination in a pastry molding and baking apparatus, with a series of traveling carriers, of cones carried thereby, rods connected to the cones, and means for depressing said rods to carry the cones from the carriers for the purpose described.

20. The combination in a pastry molding and baking apparatus with a series of traveling carriers, of cones carried thereby, rods connected to the cones, means for depressing said rods to carry the cones from the carriers, and fingers arranged between the paths of the different cones for the purpose described.

21. The combination in a pastry molding and baking apparatus with a cone carrier, of cones, a rod connected with each cone, springs for lifting the cones to bring their bases against the carrier, and a cross roller for depressing the rods.

22. The combination in a pastry molding and baking apparatus with a cone carrier, of independent cones, a rod connected with each cone, springs for lifting the cones to bring their bases against the carrier, and a stationary cross bar and loose corrugated sleeve thereon for engaging and depressing said rods.

23. The combination in a pastry molding and baking apparatus of a cone carrier, a series of cones carried thereby, means for rotating said cones, and means for carrying the cones away from and to the carrier.

24. The combination in a pastry molding and baking apparatus of a cone carrier, series of cones, a rod connected to each cone, and pinions arranged on the rods to engage each other.

25. The combination in a pastry molding and baking apparatus with a series of traveling carriers, of cones adjustable to and from said carriers, and means for shifting said cones as the carriers travel.

26. The combination in a pastry molding and baking apparatus with a series of traveling carriers, and cones rotatable on said carriers, of means for rotating said cones as the carriers travel.

27. The combination of a series of traveling carriers and cones carried thereby, means for applying batter in a liquid condition to the cones to form hollow shells, independent pusher pins, and means opposite which the carriers travel for operating the pins to bring them against the material on the cones, for the purpose set forth.

28. In a machine for making cone-shaped cakes, cup wafers and the like, a series of male and female dies between which the cones are baked in combination with means for turning the male dies during the baking operation to loosen the baked cones between the dies.

29. In a device for molding and baking hollow pastry cones, a series of conic molds, a series of conic cores adapted to enter the molds so as to mold a pastry cone between each mold and core, means for applying baking heat to said molds, and means for imparting a rotary movement to all the cores simultaneously, to loosen them from the sticking to the pastry caused by the baking heat, preparatory to withdrawing the cores from the baked pastry.

30. In a machine of the kind described, the combination of two series of mold bars having a plurality of coöperating mold parts, the mold parts of each bar of one series being mounted for simultaneous movement in respect to the bar which carries them to thereby loosen the same from the article formed in the mold, and a baking device coöperating with the molds.

31. A machine for forming hollow pastry articles comprising in combination a series of molds, a series of cones each adapted to be received in one of the molds, means for moving the molds and cones so that each of the latter will be automatically inserted in a mold, retained therein for a time and then withdrawn, means for coating the cones with batter while separated from the molds, and means for baking the batter on the cones within the molds.

In testimony whereof I affix my signature in presence of two witnesses.

EDWARD H. LANIER.

Witnesses:
 FRANK K. DRIESBACH,
 JOS. E. DOUGHERTY.